(12) United States Patent
Friedberg (10) Patent No.: US 6,969,803 B1
(45) Date of Patent: Nov. 29, 2005

(54) FACEPLATE WITH STORAGE DEVICE COUPLED THERETO

(76) Inventor: Eric Friedberg, 130 Crafts St., Newton, MA (US) 02460

( * ) Notice: Subject to any disclaimer, the term of this patent is extended or adjusted under 35 U.S.C. 154(b) by 0 days.

(21) Appl. No.: 10/625,293

(22) Filed: Jul. 23, 2003

(51) Int. Cl.[7] ............................................. H02G 3/14
(52) U.S. Cl. ........................ 174/66; 174/67; 220/241
(58) Field of Search ........................ 174/66, 67, 135; 220/241, 242

(56) References Cited

U.S. PATENT DOCUMENTS

| | | | |
|---|---|---|---|
| 2,196,786 A | 4/1940 | Wahl | |
| 3,113,996 A | 12/1963 | Sanford | |
| 3,473,859 A | 10/1969 | Kircher | |
| 4,339,045 A | 7/1982 | Bodin | |
| 4,409,536 A | 10/1983 | Evjen | |
| 4,527,110 A | 7/1985 | McCarty et al. | |
| 4,536,694 A | 8/1985 | McCarty et al. | |
| 4,921,444 A * | 5/1990 | Cama | 439/528 |
| D323,285 S | 1/1992 | Thomson | |
| 5,239,610 A | 8/1993 | Shao | |
| D402,271 S | 12/1998 | Weinberg | |
| D405,347 S | 2/1999 | Mezey | |
| 5,877,450 A * | 3/1999 | Quin | 174/66 |
| 6,130,384 A * | 10/2000 | Esteves et al. | 174/66 |
| 6,756,543 B1 * | 6/2004 | Kaloustian | 174/67 |
| 6,784,364 B2 * | 8/2004 | Kochanski et al. | 174/48 |

* cited by examiner

Primary Examiner—Dhiru R. Patel
(74) Attorney, Agent, or Firm—Kriegsman & Kriegsman (57) ABSTRACT

A faceplate which is adapted to be mounted over a dual outlet electrical receptacle includes a cover, a flange and a fastening device. A storage device includes a pocket-shaped holder and a fastening device. The fastening device of the storage device is adapted to releasably engage the fastening device on the faceplate so as to couple together the faceplate and the fastening device. In this manner, an electric appliance connected to an outlet of the electrical receptacle can be disposed within the holder of the storage device while the appliance recharges.

2 Claims, 7 Drawing Sheets

FACEPLATE WITH STORAGE DEVICE COUPLED THERETO

BACKGROUND OF THE INVENTION

The present invention relates generally to electrical equipment and, more particularly, to coverplates for wall mounted electrical outlet boxes.

Electrical boxes are well-known in residental and commerical settings and are commonly used to perform two principal functions. First, an electrical box commonly serves as a mounting structure for installing an electrical device, such as a multi-outlet receptacle, a switch or a fixture, into a covering, such as a wall or ceiling panel. Second, an electrical box commonly serves as a connection point for connecting the electrical device to electrical wires which, in turn, are coupled to a main power source.

Electrical boxes are typically shaped to include a back panel and one or more side panels which project out perpendicularly out from the back panel. The back panel and the one or more side panels together partially define an interior cavity into which the electrical wiring that is connected to the main power source is disposed. Each of the one or more side panels includes a free front edge, the free front edges of the one or more side panels together defining an open front end which provides access into the interior cavity of the electrical box.

With an electrical box properly installed into a covering such as a wall panel, an electrician electrically connects a desired electrical device, such as a dual outlet electrical receptacle, to the wires which are disposed within the interior cavity of the electrical box. In this manner, the electrical device is electrically connected to the main power source. With the electrical device electrically connected to the main power source, the device is typically positioned within the interior recess of the electrical box and is fixedly retained in place by inserting one or more screws through openings formed in the device and, in turn, into threaded engagement with bores formed in the electrical box.

It should be noted that a conventional electrical device, such as a multi-outlet receptacle or a switch, is considerably smaller in size than the open front end of the electrical box in which is it mounted. As a result, with an electrical device properly installed onto an electrical box in the manner set forth above, a portion of the open front end of the electrical box remains open, thereby providing access into the interior cavity of the electrical box. Because active electrical wires are disposed within the interior cavity of the electrical box, undesirable outside elements, such as moisture, can be introduced into the interior cavity of the electrical box, thereby creating a potentially dangerous condition.

Accordingly, it is well known in the art for a faceplate to be disposed over the open front end of an electrical box to protect the electrical wires disposed within the interior cavity of the electrical box from outside conditions.

A faceplate, also commonly referred to in the art as a cover plate, wall plate or switch plate, is typically constructed as a flat, rectangular plastic plate which is shaped to include one or more openings through which a portion of the electrical device can protrude to provide the user with a means for accessing the electrical device. A faceplate is traditionally secured directly onto the electrical device by one or more screws.

Portable electronic appliances, such as cellular telephones, vacuum operated cleaning appliances, shavers, flashlights, personal data assistants (PDAs), tape recorders, dental cleaning appliances and the like, are well-known in the art and typically derive power from one or more batteries which are electrically connected to the internal circuitry of the device. Commonly, battery operated portable appliances of the type described above are provided with a recharging circuit which enables the batteries to be recharged rather than periodically replaced, these types of appliances being commonly referred to as rechargeable portable electronic appliances in the art.

Rechargeable portable electronic appliances typically include a connector which is integrated into its housing and which is electrically connected to the recharging circuit. A recharging cord is typically provided for recharging the appliance, the first end of the cord including a connector which is adapted to releasably electrically connect with the connector on the appliance and the second end of the cord including a conventional plug which is adapted to electrically connect with the two or three prong outlet of a standard electric receptacle. A rechargeable appliance typically operates in either a passive mode (i.e., when the appliance is being recharged) or an active mode (i.e., when the appliance is being used in its intended function).

While a rechargeable portable electronic appliance is in its recharging mode, the user typically places the appliance on a flat surface in close proximity to the outlet, such as a nearby counter top or table. However, when placed on a nearby surface, such as a counter top, the device is often left exposed and unprotected from many dangerous conditions (e.g., water). For example, consumers often place a recharging electronic device on a counter top in close proximity to a sink or other similar place where standing water is commonplace. If the appliance, while recharging, is exposed to certain conditions, such as water, the device can become damaged and/or cause serious bodily injury (e.g., electrocution), which is highly undesirable.

SUMMARY OF THE INVENTION

It is an object of the present invention to provide a novel storage device.

It is another object of the present invention to provide a novel storage device which is adapted to retain a portable electronic appliance.

It is yet another object of the present invention to provide a storage device as described above which has a limited number of parts, is inexpensive to manufacture and which is easy to use.

It is still another object of the present invention to provide a storage device as described above which retains said portable electronic appliance in close proximity to the faceplate for an electronic device, such as a dual outlet receptacle.

Accordingly, there is provided the combination of a faceplate and a storage device coupled to said faceplate, said storage device being adapted to retain a portable electric appliance.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 1:
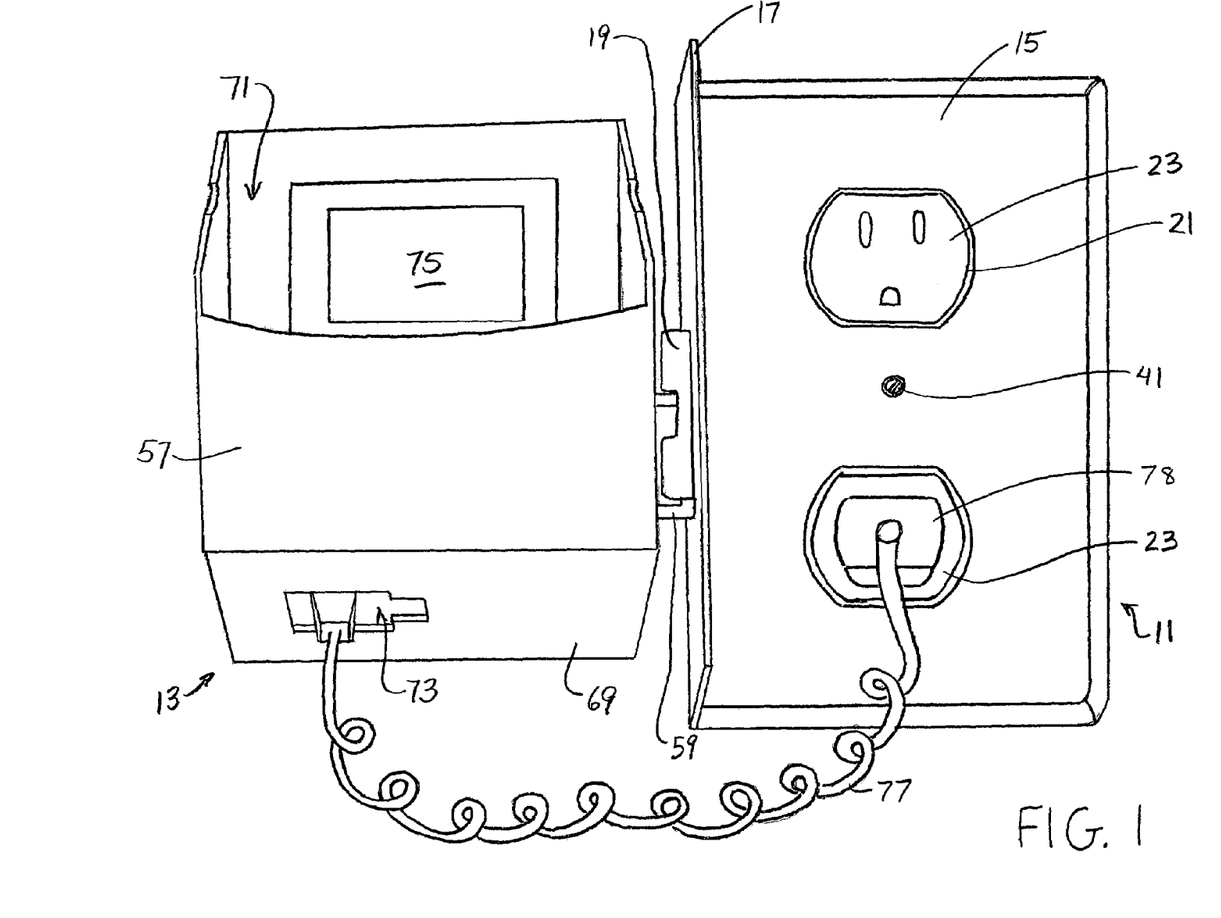
FIG. 1 is a front, bottom perspective view of a combination faceplate and storage device constructed according to the teachings of the present invention, the faceplate being shown mounted over a dual outlet electrical receptacle, the storage device being shown holding a rechargeable appliance, the rechargeable appliance being shown in electrical connection with an outlet of the receptacle by means of a charger cord.
Figure 2:
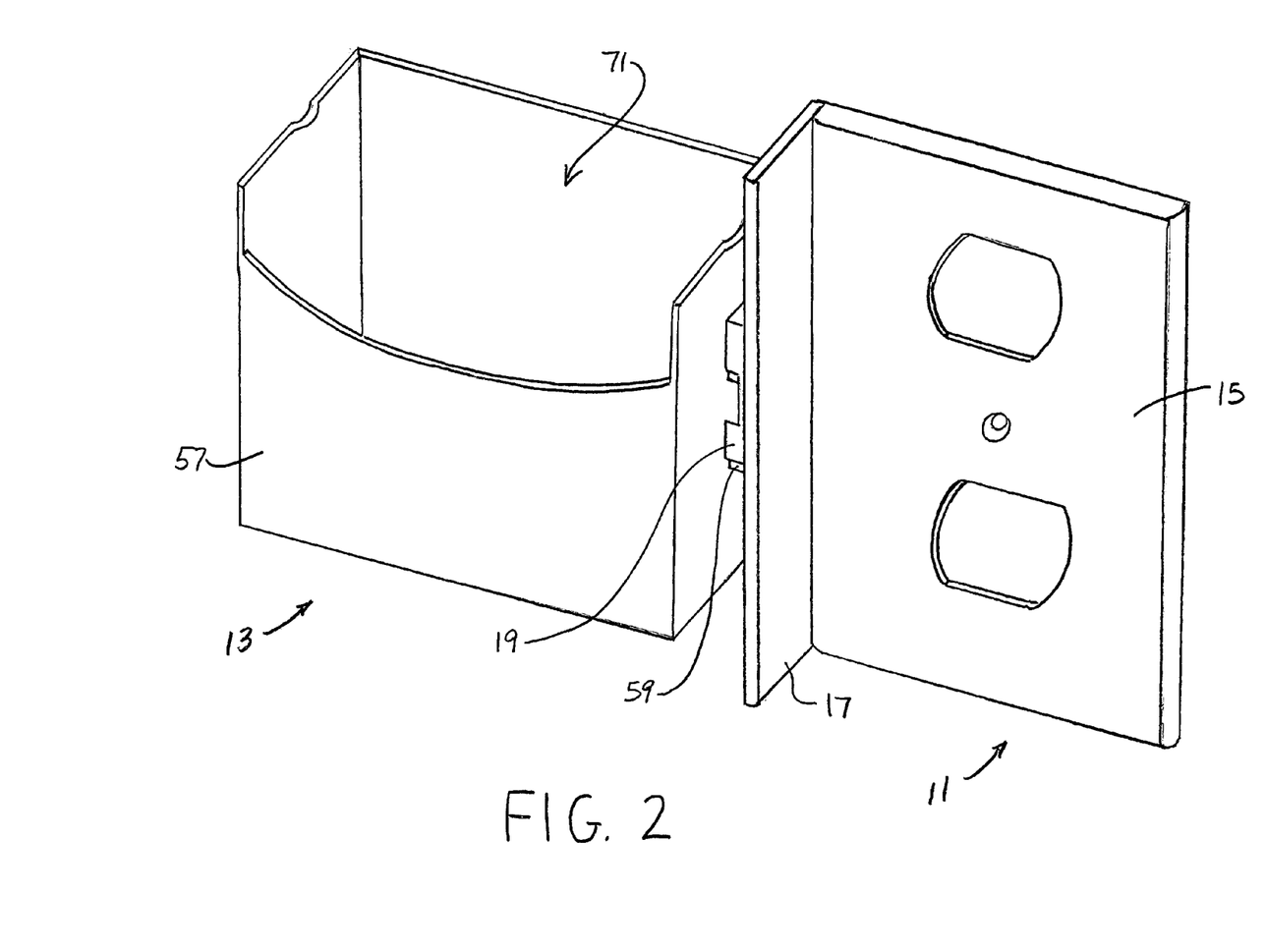
FIG. 2 is a front, right side, top perspective view of the combination faceplate and storage device shown in FIG. 1.
Figure 3:
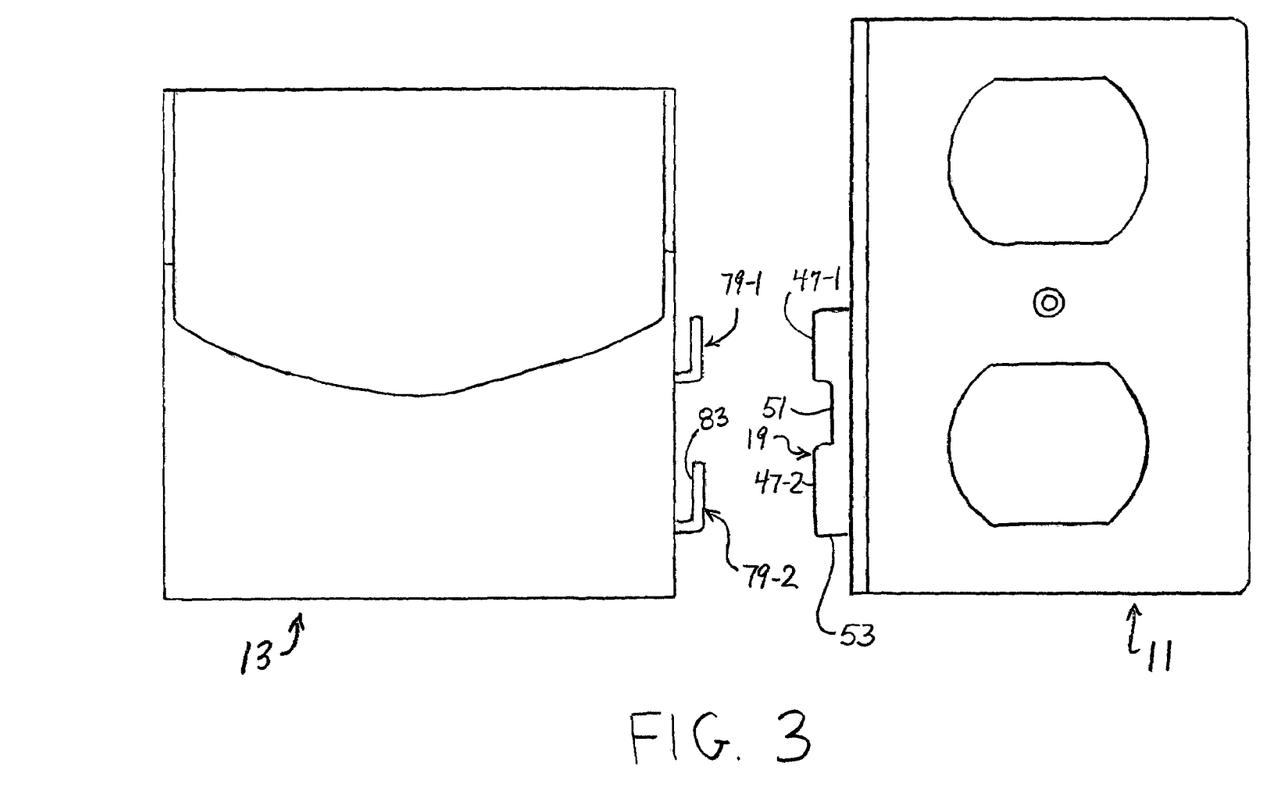
FIG. 3 is a front plan view of the combination faceplate and storage device shown in FIG. 1, the storage device being shown decoupled from the faceplate.

Referring now to FIGS. 1–3, there is shown a combination faceplate and storage device constructed according to the teachings of the present invention, said faceplate being identified generally by reference numeral 11 and said storage device being identified generally by reference numeral 13.

As will be described further in detail below, faceplate 11 and storage device 13 can be removably coupled together. However, it is to be understood that faceplate 11 and storage device 13 need not be limited to a removably coupled interrelationship. Rather, faceplate 11 and storage device 13 could, in the alternative, be manufactured as a unitary member without departing from the spirit of the present invention.

Figure 4A:
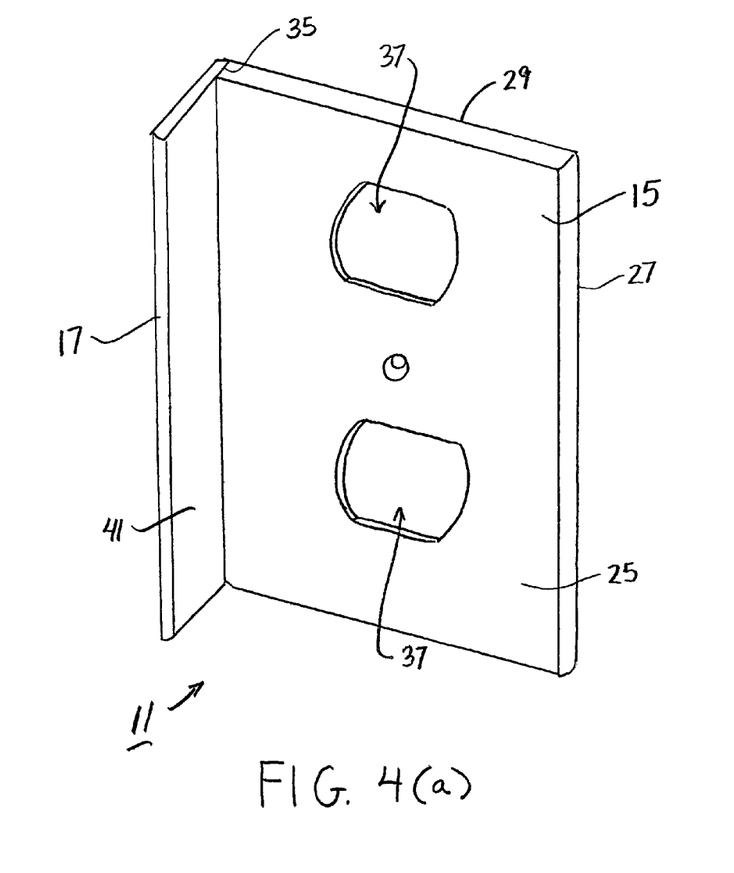
FIG. 4(a) is a front, right side, top perspective view of the faceplate shown in FIG. 3.
Figure 4B:
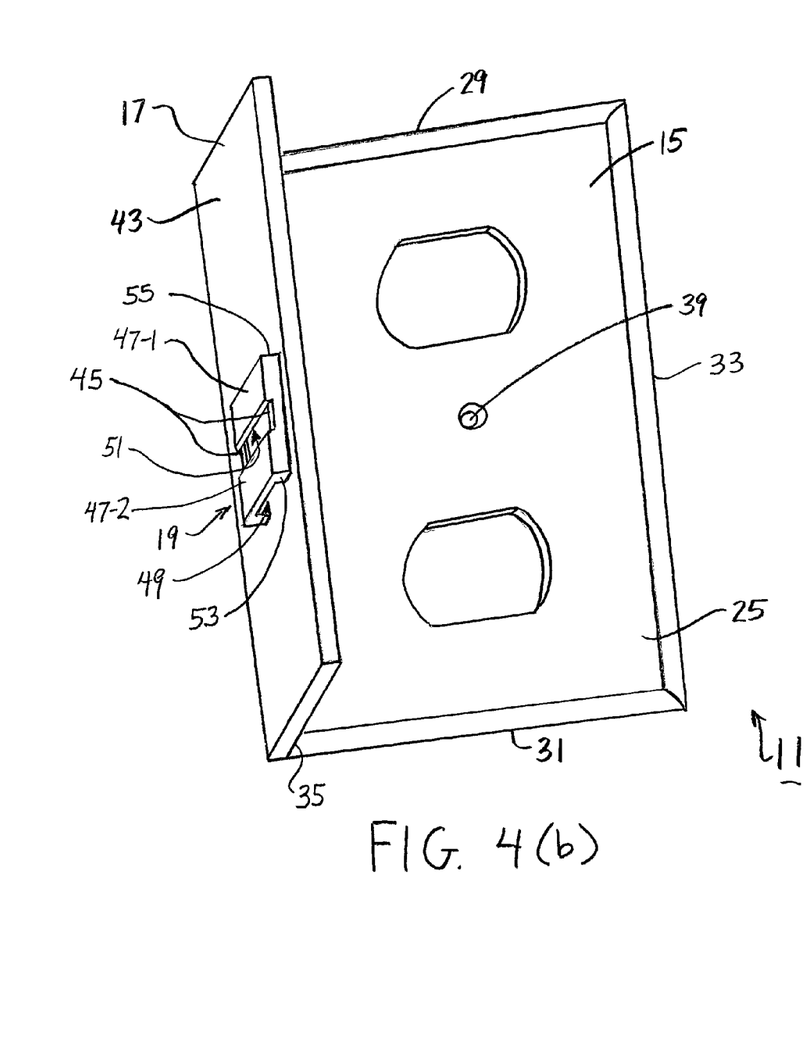
FIG. 4(b) is a front, left side, bottom perspective view of the faceplate shown in FIG. 3.

As seen most clearly in FIGS. 1, 4(a) and 4(b), faceplate 11 is a unitary device which is preferably constructed of a rigid, durable and inexpensive material, such as molded plastic. Faceplate 11 comprises a cover 15, a flange 17 integrally formed onto cover 15, and a fastening device 19 integrally formed onto flange 17.

Cover 15 is shown herein as being in the form of a conventional cover plate which can be mounted over an electrical device 21, electrical device 21 being represented in FIG. 1 as being in the form of a conventional receptacle which includes a pair of electrical outlets 23. Although cover 15 is shown herein as being of the type which can be mounted over a dual outlet receptacle, it is to be understood that cover 15 represents any conventional cover plate which is well-known in the art. As a result, cover 15 could be modified to be of the type which can be mounted over other types of electrical devices, such as switches, without departing from the spirit of the present invention.

Cover 15 is generally rectangular and flat in shape and comprises a substantially flat front face 25, a rear face 27, a top edge 29, a bottom edge 31, a right side edge 33 and a left side edge 35. Preferably, flat front surface 25 is convexly rounded along its outer periphery and gradually tapers into edges 29, 31, 33 and 35 for aesthetic purposes. Cover 15 is additionally shaped to define a pair of vertically disposed openings 37, each opening 37 being sized and shaped to fittingly receive an associated outlet 23 therethrough. Furthermore, cover 15 is shaped to define a small circular hole 39 between openings 37, front face 25 being countersunk around hole 39. As will be described further below, hole 39 is sized and shaped to receive a screw 41. In this manner, screw 41 can be inserted through hole 39 and into a threaded bore formed in electrical device 21 between outlets 23 so as to secure cover 15 in position over electrical device 21.

Flange 17 is an elongated, flat rectangular member which includes a substantially flat inner surface 41 and a substantially flat outer surface 43. Flange 17 is integrally formed onto cover 15 along the length of left side edge 35, flange 17 extending out from cover 15 at an approximate right angle relative to flat front face 25.

As seen most clearly in FIG. 4(b), fastening device 19 is a unitary member which is integrally formed onto outer surface 43 of flange 17. Fastening device 19 is in the form of a bracket which includes a pair of short, spaced apart ribs 45 which are disposed in a parallel configuration, each rib 45 protruding orthogonally out from outer surface 43 of flange 17. A pair of flat retention panels 47-1 and 47-2 are integrally formed onto the free end of ribs 45, each flat retention panel 47 lying flat across ribs 45 and in parallel with outer surface 43. Together, ribs 45 and panels 47 are generally U-shaped in lateral cross-section along a portion of its length and partially define a slot 49 therebetween. It should be noted that panels 47 are spaced apart so as to define an opening 51 which is in communication with slot 49. Furthermore, fastening device 19 includes a first end 53 and a second end 55, first end 53 being open and in communication with slot 49 and second end 55 being closed.

Figure 5A:
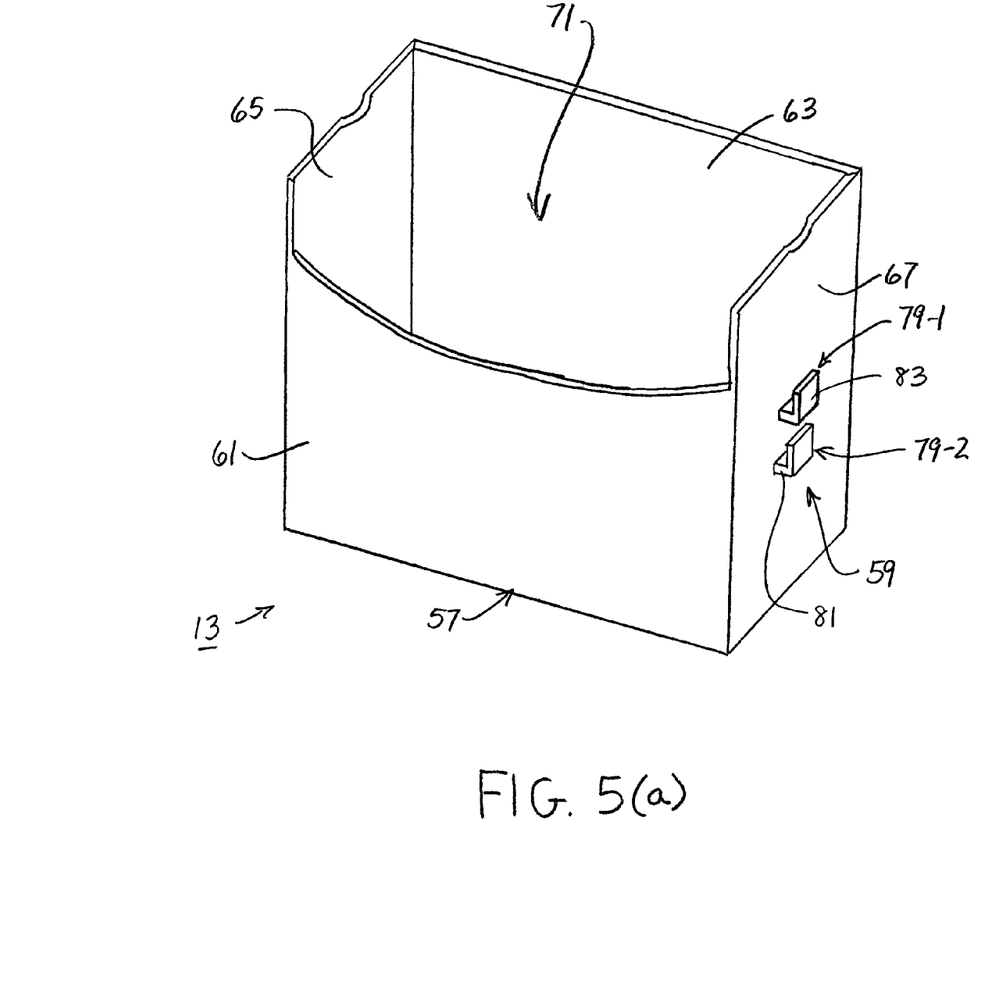
FIG. 5(a) is a front, right side, top perspective view of the storage device shown in FIG. 3.
Figure 5B:
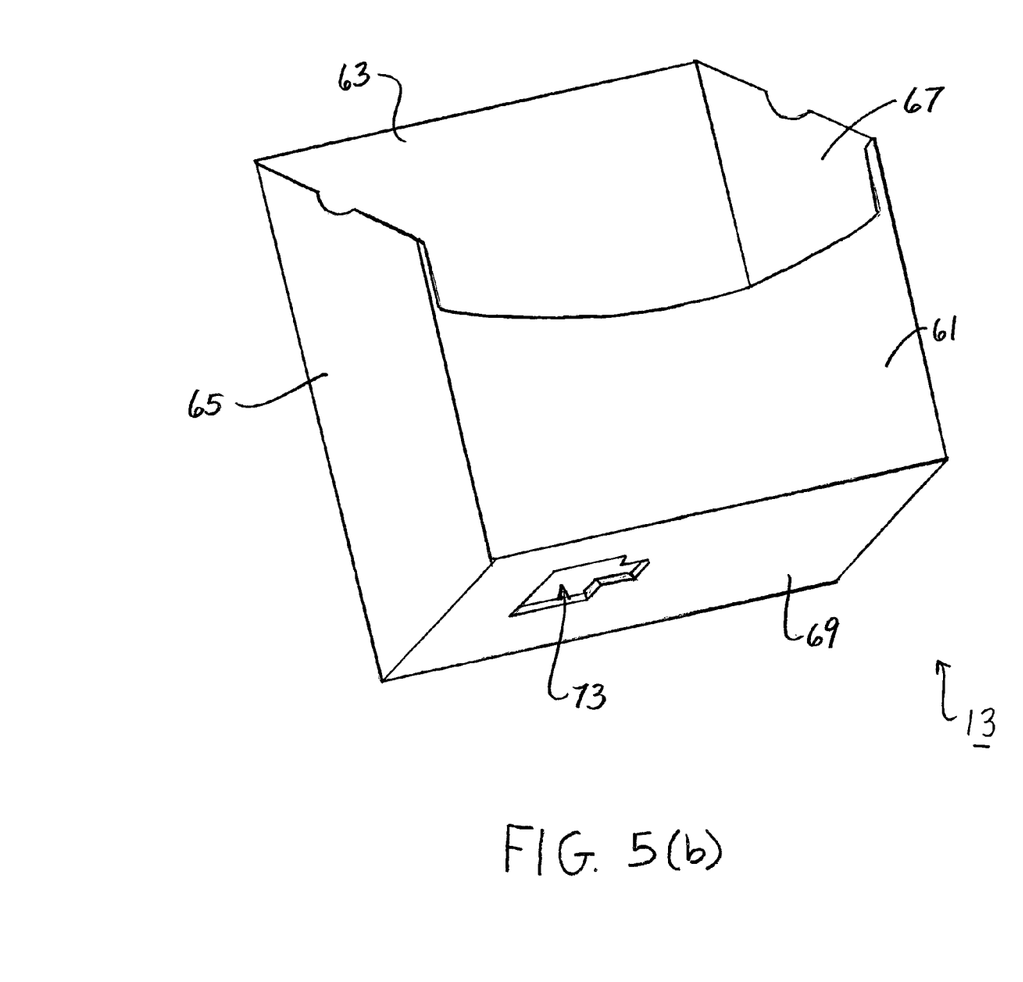
FIG. 5(b) is a front, left side, bottom perspective view of the storage device shown in FIG. 3.

Referring now to FIGS. 1, 5(a) and 5(b), storage device 13 is a unitary device which is preferably constructed of a rigid, durable and inexpensive material, such as molded plastic. Storage device 13 comprises a pocket-shaped holder 57 and a fastening device 59 integrally formed onto holder 57.

Pocket-shaped holder 57 includes a front panel 61, a rear panel 63, a left side panel 65, a right side panel 67 and a bottom panel 69 which together define an interior cavity 71. Bottom panel 69 is shaped to include a narrow slot 73 which is in communication with interior cavity 71. As will be described further below, holder 57 is sized and shaped to retain a portable, rechargeable, electric appliance 75 within interior cavity 71. In this manner, electric appliance 75 can be safely retained within interior cavity 71 of holder 57 while being recharged by electric outlet 23 via charger cord 77, cord 77 extending from outlet 23, through slot 73 in bottom panel 69 and into electrical connection with appliance 75.

Electric appliance 75 is represented in FIG. 1 as a portable, rechargeable cellular phone. However, it is to be understood that electric appliance 75 is not limited to being in the form of a portable, rechargeable cellular phone. Rather, electric appliance 75 represents any portable, rechargeable electric appliance which is well-known in the art. For example, electric appliance 75 could represent, among other things, a vacuum operated cleaning appliance, an electric shaver, a flashlight, a personal data assistant (PDA), a tape recorder or a dental cleaning appliance without departing from the spirit of the present invention.

As seen most clearly in FIG. 5(a), fastening device 59 is integrally formed onto the outer surface of right side panel 67. Fastening device 59 is in the form of a pair of L-shaped hooks 79-1 and 79-2, hooks 79 being formed onto right side panel 67 in a vertically arranged, spaced apart configuration.

Each hook 79 includes a short horizontal member 81 which extends generally orthogonally out from outer surface of right side panel 67 and an elongated vertical member 83 which extends generally orthogonally up from the free end its associated horizontal member 81, thereby providing each hook 79 with a generally L-shaped configuration.

As can be appreciated, fastening devices 19 and 59 are designed to releasably engage one another so as to removably couple storage device 13 to faceplate 11. Specifically, with faceplate 11 mounted on a wall over electrical device 21, storage device 13 can be configured such that hook 79-1 penetrates through opening 51 in fastening device 19 with hook 79-2 disposed directly beneath open first end 53 of fastening device 19. The upward displacement of storage device 13 causes vertical members 83 of hooks 79 to slide within slot 49 of fastening device 19, with vertical member 83 of hook 79-1 disposed into fitted engagement against the underside of retention panel 47-1 and vertical member 83 of hook 79-2 disposed into fitted engagement against the underside of retention panel 47-2. In this capacity, the frictional engagement of hooks 79 onto the underside of retention panels 47 serves to couple storage device 13 to faceplate 11, which is highly desirable. As can be appreciated, hooks 79 can be disengaged from the underside of retention panels 47 by sliding storage device 13 in the opposite (i.e., downward) direction.

It should be noted that the means for coupling storage device 13 to faceplate 11 is not limited to the bracket and hooks interrelationship as described herein. Rather, it is to be understood that fastening devices 19 and 59 are meant to represent any conventional fastening means for releasably coupling together two or more objects. For example, fastening devices 19 and 59 could, in the alternative, be in the form of a tab and slot type interconnection or a hook and pile type interconnection without departing from the spirit of the present invention.

In use, the combination faceplate 11 and storage device 13 can be used in the following manner. Specifically, cover 15 of faceplate 11 is adapted to be readily mounted onto a wall, or other similar surface, over electrical device 21. With cover 15 mounted over electrical device 21, electrical outlets 23 are sized and shaped to fittingly protrude through openings 37 so as to provide the consumer with access to device 21. With cover 15 properly mounted over electrical device 21, screw 41 can be disposed through opening 39 in cover 15 and into threaded engagement with a bore formed in device 21 to secure cover 15 in place over device 21.

With cover 15 of faceplate 11 mounted over electrical device 21 in the manner noted above, fastening devices 19 and 59 can be used to releasably couple storage device 13 to faceplate 11.

When electrical device 21 is to be used to provide power to recharge an electric appliance 75, storage device 13 is slidably mounted onto faceplate 11 in the manner described above. With storage device 13 coupled to faceplate 11, a plug 78 which is formed onto a first end of charger cord 77 is inserted into an outlet 23 of electrical device 21. The second end of charger cord 77 is then inserted through slot 73 in storage device 13 and into interior cavity 71. The second end of charger cord 77 is then plugged into a corresponding receptacle in the electric appliance 75 which requires recharging. In this capacity, charger cord 77 serves to electrically connect the recharging circuit for appliance 75 to outlet 23, which is highly desirable.

While recharging, appliance 75 can be retained within interior cavity 71 of storage device 13. In this manner, appliance 75 is less susceptible to damage which could be caused by placing appliance 75 on a nearby surface, such as a table or countertop, which is highly desirable.

Once appliance 75 has completed recharging, charger cord 77 can be removed from outlet 23 and appliance 75. Appliance 75 can be removed from storage device 13 and used as desired. Furthermore, if deemed necessary, the consumer can remove storage device 13 from faceplate 11 by decoupling fastening device 59 from fastening device 19, storage device 13 capable of being stored in an alternate location until further recharging is required.

The embodiment shown in the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. The combination of:
   (a) a faceplate, said faceplate being sized and shaped to at least partially cover an electrical receptacle having one or more outlets, said faceplate including a first fastening device, said first fastening device being in the form of a bracket that is shaped to define a slot; and
   (b) a storage device coupled to said faceplate, said storage device being sized and shaped to retain a portable electric appliance, said storage device comprising a front panel, a rear panel, a pair of side panels and a bottom panel which together partially define an interior cavity, at least one of said panels being shaped to include an opening, said storage device including a second fastening device, said second fastening device being in the form of a hook,
   (c) wherein the second fastening device is sized and shaped to fittingly protrude into the slot and releasably engage the first fastening device.

2. The combination of:
   (a) a faceplate, said faceplate being sized and shaped to at least partially cover an electrical receptacle having one or more outlets, said faceplate including,
      (i) a cover, said cover comprising a substantially flat front surface,
      (ii) a flange, said cover and said flange being integrally formed together; said flange extending generally orthogonally out from the flat front surface of the cover, and
      (iii) a first fastening device formed on the flange; and
   (b) a storage device coupled to said faceplate, said storage device being adapted to retain a portable electric appliance, said storage device including a second fastening device which is sized and shaped to releasably engage the first fastening device.

* * * * *